May 28, 1940.  S. CLINE  2,202,756
FLUID HEATER
Filed June 22, 1939
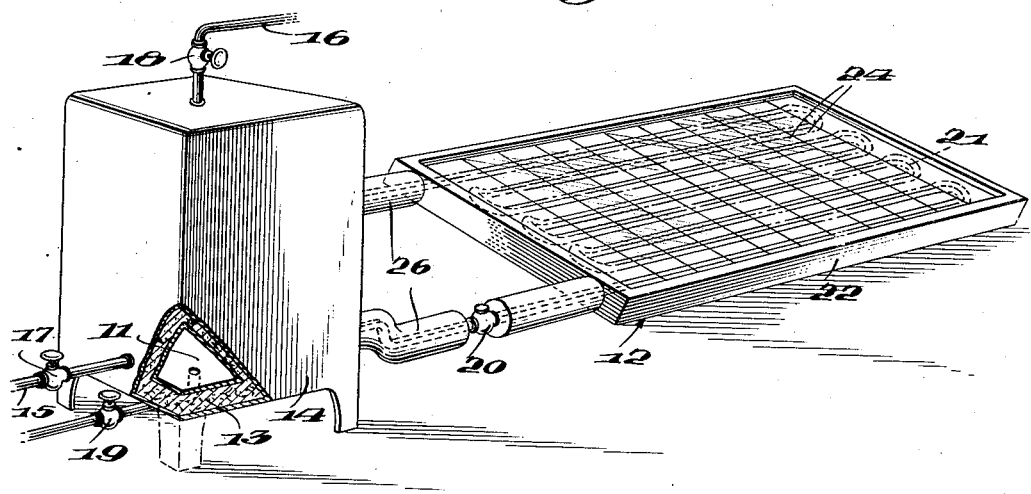
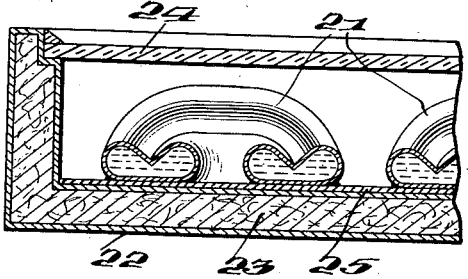
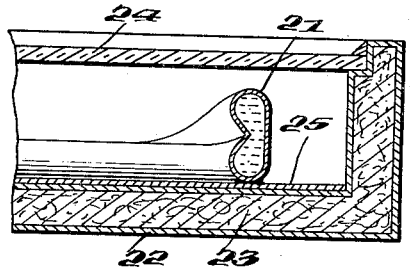
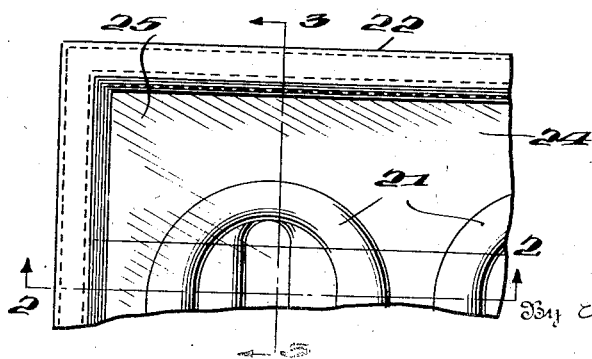
Inventor
Sherrill A. Cline,
Attorney Patented May 28, 1940

2,202,756

UNITED STATES PATENT OFFICE 2,202,756

FLUID HEATER

Sherrill Cline, Miami, Fla.

Application June 22, 1939, Serial No. 280,626

3 Claims. (Cl. 126—271)

This invention relates to hot water heaters in which energy from the rays of the sun is utilized for maintaining the temperature of the water in a storage tank of suitable size for domestic use.

The invention aims to provide a simple and comparatively inexpensive apparatus for receiving and storing solar radiation, which will have a long useful life with a minimum expense for upkeep, and which will enable a sufficiently high temperature to be maintained in the storage tank for usual household purposes.

An important object of the invention is to improve upon existing solar water heaters of the domestic type so as to increase the temperature of the water normally maintained under usual operating conditions.

Another object is to increase the storage capacity of the apparatus relatively to the heater capacity whereby losses by radiation in the latter during periods of little or no sunshine will be minimized.

Other objects are to adapt such heaters to residence, apartment, hotel and institution use by suitably balancing the heating and storage capacity to the character and size of the building served, and to enable continuous service to be maintained satisfactory to the different classes of users.

With these objectives, the invention consists in the shape and arrangement of the heating coils and cooperating storage and control means, and their insulation and protection from cold, weather and other detrimental influences, as hereinafter described.

A preferred embodiment of the invention is illustrated in the drawing, wherein:

Fig. 1 is a schematic view of the coil and storage tank;

Fig. 2 is a cross-section on the line 2—2 in Fig. 4 of the preferred form of tube and radiation receiving element used in the coil, drawn to a larger scale than Fig. 1;

Fig. 3 is a cross-section on the line 3—3 in Fig. 4 showing the change in the position of the tube element at the end loops of the coil; and Fig. 4 is a plan view of a portion of the heater element, drawn to the same scale as Figs. 2 and 3.

In the form of apparatus illustrated, a storage tank 11 is located at any convenient place in or adjacent to the building to be served with hot water and at a somewhat higher elevation than the radiation absorption unit 12, hereinafter referred to as the heater. The storage tank is of any desired type of construction adapted to stand the pressure in the water service main, and is surrounded by five or six inches of insulating material 13, such as cork or mineral wool, protected by a suitable casing 14. The storage tank is supplied with water from the service main through a pipe 15 entering near its bottom, and is connected to the hot water line serving the building through a pipe 16 leaving the tank near the top, as indicated in Fig. 1 of the drawing. Suitable valves 17, 18, are provided for closing these pipes in case the water in the tank has to be drained out for any purpose, and a drain cock 19 is also fitted in the bottom of the tank which may be opened periodically to flush out any sediment that may collect in the bottom of the tank.

The heater 11 comprises a serpentine coil 21 of seamless copper tubing, made of one continuous length from end to end, flattened on one side and indented to form two lobes on the side opposite the flattened side, and free from angles or abrupt turns and with no abrupt changes in cross-sectional shape. The coil is mounted in a galvanized steel pan or casing 22 closed underneath and open above, and sloping accoding to the latitude to expose the indented side of the coil to the maximum effectiveness of the sun's rays. The bottom and sides of the casing are suitably insulated against radiation of heat by layers 23 of cork or mineral wool, and the top is covered with sheets 24 of glass to permit the sun's rays to reach the coil and prevent air currents from carrying away the heat generated therein. The coil is preferably backed by strips of sheet copper 25 to which it is soldered, brazed or welded along its flat side to afford a maximum thermal contact between the two, thereby greatly increasing the amount of solar radiation that effectively reaches the water in the coil for heating it.

The coil 21 is connected by appropriate fittings to the tank 11 at its ends, which are circular in cross-section and protected by insulated coverings 26, one end opening into the side wall of the tank near its bottom and the other end discharging into the side wall of the tank near its top, care being taken in erecting the heater unit to provide for a slight upward slope from inlet to outlet end of the pipe to insure thermal circulation. A check valve 29 may be placed at the inlet end of the coil to prevent back flow if desired. When the sun's rays are impinging on the heating unit, the water in the coil will be heated to the point that thermal circulation will be set up causing it to flow into the top of the tank, and the cooler water in the botom of the tank will flow into the coil and be heated, thereby maintaining continuous circulation so long as heat is supplied thereto. The double lobe cross-sectional shape of the pipe forming the greater part of the coil 21 provides a maximum of radiation receiving surface from above and heat conduction surface from the backing sheets which also receive solar radiation, in proportion to the amount of water in the coil, without unduly impeding circulation, and also prevents bursting from any occasional freezing temperatures.

The capacity of the tank 11 is made sufficient to store enough water for the normal supply needed by the occupants of the building at night and on days of little sunshine, experience indicating that in the latitude and climate of Florida, about twenty gallons per person storage capacity is adequate for residences and twenty-five gallons per person for apartment houses to provide hot water for eighty hours. Hotels and institutions housing many persons require from ten to twenty gallons capacity per person.

The heater unit may be installed on the lower edge of a sloping room of a residence with the tank disposed in the attic or peak of the chamber within or concealed in an imitation chimney projecting above the roof, or the complete installation may be on the ground adjacent to the building to be served if sufficient space is available. No attention is required except to flush out the tank periodically to remove deposits of sediment.

Experience with installations near Palm Beach and Miami, Florida, indicates that the illustrated heater unit will maintain a water temperature about ten degrees higher than similar installations employing circular pipes having the same length and capacity for flow of water. Other advantages of the invention are freedom from liability of cracking the heater pipe from freezing, absence of all joints or fittings in the pipe which reduce the velocity of flow, irreversible flow preventing cooling of the water in the storage tank when there is insufficient radiation impinging on the heater to maintain the temperature of the water in the coil, full head of water present at all times regardless of the temperature, and no operating or maintenance cost except for accidents.

The invention is not restricted to the apparatus shown in the drawing, as it is contemplated that modifications may be made to suit the surroundings and character of installation desired.

I claim the following as my invention:

1. A heating unit for a water heater of the direct radiation type comprising a flat receptacle insulated on the bottom and open at the top, said unit consisting of a sheet of metal of high heat conductivity, and a continuous metal pipe of high heat conductivity arranged thereon, said pipe having a flat side of substantial width soldered to said sheet, the opposite side of said pipe having two parallel portions convex outwardly connected by an indented middle portion to provide maximum wall areas for receiving radiation from a source opposite said open top.

2. A radiation receiving pipe having a flat side of substantial area adapted to receive heat by conduction from an adjacent source and a convex side provided with a lengthwise extending indentation dividing the interior of the pipe into two lobes connected by a narrower passage adapted to receive heat by direct radiation from a distant source.

3. A seamless copper pipe for use in fluid heaters having its ends of circular cross-section and its intermediate length flattened on one side and indented lengthwise on the side opposite said flattened side to provide two lobes, thereby providing a conduit for free thermal circulation of water with opposite walls one of which is adapted to intercept a maximum amount of radiation and the other of which is adapted to receive a maximum amount of heat by conduction.

SHERRILL CLINE.